United States Patent
Hamalainen et al.

(10) Patent No.: US 10,034,180 B2
(45) Date of Patent: Jul. 24, 2018

(54) DETERMINING AN ADJUSTMENT OF A TILT ANGLE FOR AN ANTENNA SERVING A VERTICALLY SECTORIZED CELL OF A RADIO NETWORK

(71) Applicant: NOKIA SOLUTIONS AND NETWORKS OY, Espoo (FI)

(72) Inventors: Seppo Olavi Hamalainen, Espoo (FI); Petri Eskelinen, Jyväskylä (FI); Henrik Martikainen, Jyväskylä (FI); Bernhard Wegmann, Holzkirchen (DE); Krzysztof Kordybach, Pulawy (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/112,859

(22) PCT Filed: Jan. 24, 2014

(86) PCT No.: PCT/EP2014/051359
§ 371 (c)(1),
(2) Date: Jul. 20, 2016

(87) PCT Pub. No.: WO2015/110166
PCT Pub. Date: Jul. 30, 2015

(65) Prior Publication Data
US 2016/0345183 A1 Nov. 24, 2016

(51) Int. Cl.
*H04B 1/00* (2006.01)
*H04B 15/00* (2006.01)
(Continued)

(52) U.S. Cl.
CPC ........... *H04W 16/28* (2013.01); *H04W 24/02* (2013.01); *H04W 24/08* (2013.01); *H01Q 1/246* (2013.01); *H01Q 3/24* (2013.01)

(58) Field of Classification Search
CPC ...... H04W 36/26; H04W 29/02; H04W 16/28
(Continued)

(56) References Cited

U.S. PATENT DOCUMENTS

| 2006/0140117 A1* | 6/2006 | Aerrabotu | H04W 36/26 370/232 |
| 2013/0023217 A1* | 1/2013 | Zhuang | H04W 24/02 455/63.1 |

(Continued)

FOREIGN PATENT DOCUMENTS

| WO | WO 2013/004288 A1 | 1/2013 |
| WO | WO 2013/134128 A1 | 9/2013 |

(Continued)

OTHER PUBLICATIONS

International Search Report dated Jan. 8, 2015 corresponding to International Patent Application No. PCT/EP2014/051359.
(Continued)

*Primary Examiner* — William D Cumming
(74) *Attorney, Agent, or Firm* — Squire Patton Boggs (US) LLP

(57) ABSTRACT

There is provided a method and an apparatus for determining an adjustment of a tilt angle ($\alpha 1$, $\alpha 2$) for a beam emitted from an antenna (130) of a base station (100) which is serving a vertically sectorized cell (150) of a cellular radio telecommunication network. The method comprises (a) configuring user equipments (162, 164) being located in the vertically sectorized cell (150) with dedicated measurements, (b) collecting the dedicated measurements for a specific time interval, (c) obtaining a spatial user equipment distribution among a first sector (152) of the cell (150) and a second sector (154) of the cell (150) based on the collected dedicated measurements, (d) ascertaining an optimized spatial overlap region between the first sector (152) and the second sector (154) based on the obtained spatial user
(Continued)

equipment distribution, and (e) determining the adjustment of the tilt angle ($\alpha 1$, $\alpha 2$) based on the ascertained optimized spatial overlap region.

12 Claims, 2 Drawing Sheets

(51) Int. Cl.
  *H04W 16/28*   (2009.01)
  *H04W 24/02*   (2009.01)
  *H04W 24/08*   (2009.01)
  *H01Q 1/24*    (2006.01)
  *H01Q 3/24*    (2006.01)

(58) Field of Classification Search
  USPC .............................. 370/232, 329; 455/63.1
  See application file for complete search history.

(56) References Cited

U.S. PATENT DOCUMENTS

2013/0235807 A1* 9/2013 Lee ...................... H04W 16/28
                                                            370/329
2016/0345183 A1* 11/2016 Hamalainen .......... H04W 16/28

FOREIGN PATENT DOCUMENTS

WO   WO 2014/146700 A1   9/2014
WO   WO 2015/043618 A1   4/2015

OTHER PUBLICATIONS

Osman N. C. Yilmaz et al., "System Level Analysis of Vertical Sectorization for 3GPP LTE," Wireless Communication Systems, 2009. ISWCS 2009. 6th International Symposium on, IEEE, Sep. 7, 2009, pp. 453-457, XP031545245.

* cited by examiner

DETERMINING AN ADJUSTMENT OF A TILT ANGLE FOR AN ANTENNA SERVING A VERTICALLY SECTORIZED CELL OF A RADIO NETWORK

FIELD OF INVENTION

The present invention generally relates to the technical field of wireless communication within cellular radio telecommunication networks. In particular, the present invention relates to the operation of vertically sectorized cells within cellular radio telecommunication networks. Specifically, the present invention relates to a method and an apparatus for determining an adjustment of a tilt angle for a radio beam emitted from an antenna realizing a vertically sectorized cell.

ART BACKGROUND

As the number of wireless cellular data communication devices continues to increase and as their data capabilities continue to be more and more heavily used, the demands on available infrastructure and resources e.g. in the frequency domain continue to increase. The addition of infrastructure to meet this ever increasing demand is costly, and is becoming more and more difficult as unoccupied space suitable for placement of base stations diminishes. In addition, as saturation of available wireless communication frequencies approaches, addition of infrastructure approaches a point of ineffectiveness.

In order to support the ever increasing demand for data communication services, network operators are turning more and more towards increasing the efficiency of their operations. One mechanism that has shown promise is the use of active antenna systems (AAS) for base stations which can be employed for realizing a so called vertical sectorization (VS) of at least some of the cells of a cellular radio telecommunication network. AAS comprise radio antennas each having at least two antenna elements and an appropriate control entity.

In the case of transmitting, the radio signals are split up according to the number of antenna elements and the control entity is capable of adjusting the phase shift and the signal power individually for each antenna element in order to generate different beams for different radio signals such as different radio frequency (RF) drive signals, for different radio access technologies (RATs), or even for different intra-frequency cells as in case of vertical sectorization. Depending on the selected phase difference and the geometry and the relative spatial arrangement of the antenna elements the transmitted radio beam can be spatially directed towards a preferred region.

In the case of receiving, the control entity is capable of adjusting the phase shift and a sensitivity for receiving signal power individually for each antenna element in order to be sensitive for different radio beams. Thereby, the sensitivity for receiving radio signals which have been emitted by transmitters (e.g. radio communication end device or user equipments) being located within predetermined regions can be adapted.

Descriptive speaking, one significant benefit of AAS is the ability to control antenna parameters electronically, such as by changing azimuth and elevation patterns and steering radiated radio beams vertically and horizontally. Tilt control provided by AAS may be accomplished on a carrier basis, a frequency basis, or a service basis allowing flexibility for advanced network planning features such as VS.

Further, AAS are radio embedded base station antennas that integrate conventional base station RF components with the antenna elements. Such an approach has the direct effect of eliminating RF power losses in RF feeder cables and minimizing the number of hardware items which have to be implemented within a base station.

VS increases the number of cells beyond the number provided by conventional mechanisms, generally enabling two cells in the vertical plane per conventional cell sector. In general, the outer sector is optimized for cell coverage and the inner sector is adjusted in order to maximize network capacity. Thereby, two dedicated sectors are created which effectively doubles available resources over the area as a whole, thus significantly improving the performance of the respective cellular radio telecommunication network. VS also allows for directing dedicated resources to sector edges, thus improving outer sector coverage. In addition, VS can lower deployment and operational costs for operators by reducing the number of base station sites required.

In cells employing a VS the antenna tilts for inner and outer sectors should be selected in such a manner that the radio traffic load is more or less equally shared between the inner sector and the outer sector. Thereby, the radio traffic load can be measured through e.g. a determination of Transmission Time Interval (TTI) usage in the inner sector and the outer sector. On the other hand an overlap region area between the inner sector and the outer sector causes unfavorable interference in case of frequency reuse and should therefore be minimized. This holds in particular in case of a user concentration in that overlap area.

Correct antenna tilts are usually a compromise between increased number of resources per area and interference due to the additional cell border between the inner sector and the outer sector in particular in case of a so called co-channel deployment.

There may be a need for determining an optimized beam tilt setting for a base station providing flexible cell deployment which relies on the principles of a vertical sectorization (VS).

SUMMARY OF THE INVENTION

This need may be met by the subject matter according to the independent claims. Advantageous embodiments of the present invention are described by the dependent claims.

According to a first aspect of the invention there is provided a method for determining an adjustment of a tilt angle for a beam emitted from an antenna of a base station which is serving a vertically sectorized cell of a cellular radio telecommunication network. The provided method comprises (a) configuring user equipments being located in the vertically sectorized cell with dedicated measurements, (b) collecting the dedicated measurements for a specific time interval, (c) obtaining a spatial user equipment distribution among a first sector of the cell and a second sector of the cell based on the collected dedicated measurements, (d) ascertaining an optimized spatial overlap region between the first sector and the second sector based on the obtained spatial user equipment distribution, and (e) determining the adjustment of the tilt angle based on the ascertained optimized spatial overlap region.

The described method is based on the idea that by determining an optimized spatial overlap region between the different sectors of a vertically sectorized cell based on a before obtained spatial distribution of user equipments (UEs) among the different sectors of a cell an optimized tilt angle for a beam emitted from an antenna serving the cell can be determined in a reliable manner. Specifically, it is not necessary to perform an iterative procedure where the tilt angle is optimized step wise by means of trial and error until a radio data traffic between the different sectors is in a targeted balance. In such a trial and error iterative procedure it is not known before a certain beam tilt angle adjustment is performed what the real impact of the changed beam tilt angle would really be. Therefore, a corresponding algorithm will make wrong decisions from time to time, which will need to be rolled-back. Further, typically a plurality of optimization steps will be needed in order to find a correct tilt angle. As a consequence, such an algorithm may take long time—hours or even a day—until it will find an optimum tilt angle.

By contrast thereto, with the invented method described in this document the determination of an optimized adjustment for the tilt angle for a beam emitted from an antenna serving a vertically sectorized cell is based on an a-priori knowledge about the current spatial distribution of UEs within the served cell. This a-priori knowledge has been obtained with the described method steps being carried out prior to the last determining step. This allows to optimize the beam tilt angle much more precisely and within a much shorter amount of time.

In other words, if a vertical sectorization (VS) beam tilt optimization is made based simply on radio traffic load, the beam tilt optimization is based on trial and error leading to wrong decision from time to time. With the invented method described in this document more accurate and therefore faster decisions can be made as the described algorithm provides a knowledge about the spatial distribution of the UEs to be covered before the VS beam tilt optimization step is taken. In this document the term "configuring the UEs with dedicated measurements" may mean in particular the modality how the UEs are instructed by the base station to perform its measurements for obtaining information about the quality of the radio link between the base station and the respective UE. The measurement configuration may be provided by the base station to the UEs in a known manner e.g. by Radio Resource Control (RRC) signaling. When being configured the UEs receive a certain number with predefined measurement events and/or thresholds for detecting such predefined measurement events. In case a measurement result fulfills such a predefined (handover) event the respective UE will send a corresponding radio message to the base station which will then evaluate these radio messages. Possible events are e.g. the so called LTE RRC Measurement Event A3 which is specified in 3GPP specifications for Long Term Evolution (LTE) telecommunication networks and which indicates that the "neighbor cell becomes better than an offset relative to the serving cell". Other examples are the LTE RRC Measurement Event A4 which indicates that the "neighbor cell becomes better than absolute threshold" or the LTE RRC Measurement Event B2 which indicates that the "serving cell becomes worse than absolute threshold and neighbor cell becomes better than another absolute threshold". It is mentioned that this list is not exclusive and that other handover events which are also contained in 3GPP specifications can also be used. It is further mentioned that the measurement configuration may also include parameter values e.g. for the above given parameters "offset", "absolute threshold" and/or "another absolute threshold".

It is pointed out that a forthcoming adjustment of the beam tilt angle is typically not carried out by changing physically the orientation of the antenna (comprising different antenna elements). As has already been described above in the introductory portion of this document, the physical adjustment of the beam tilt angle is typically carried out by adjusting the phase relationships between the different antenna elements in order to accomplish an appropriate beam forming based on the known principles of multi antenna element communication techniques.

According to an embodiment of the invention the first sector is an inner sector of the cell and the second sector is an outer sector of the cell. This may provide the advantage that all benefits being related to a known VS can be exploited and the described method, which compared to known beam tilt adapting procedures yields a much faster optimization of the antenna tilt angle, can be used in a beneficial manner.

According to a further embodiment of the invention (a) the vertically sectorized cell comprises at least one further sector, (b) the spatial user equipment distribution is obtained among the first sector, the second sector and the at least one further sector. The method further comprises (c) ascertaining at least one further optimized spatial overlap region between (i) the at least one further sector and (ii) the first sector and the second sector, and (d) the adjustment of the tilt angle is further based on ascertained at least one further optimized spatial overlap region.

Descriptive speaking, according to the exemplary embodiment described here the method described in this document can also be applied to a cell of a cellular radio telecommunication network, which is sectorized in more than two sectors. With respect to the maximum number of sectors (i.e. the degree of sectorization) there is no principal limit.

According to a further embodiment of the invention dedicated measurements of selected user equipments are collected, which selected user equipments are located in a predefined spatial overlap region between the first sector and the second sector.

With this embodiment of the invention the amount of data representing the entirety of the dedicated measurement configurations will be reduced. As a further consequence the computational effort for carrying out the described method can also be significantly reduced.

According to a further embodiment of the invention collecting the dedicated measurements comprises (a) performing, by the user equipments, radio measurements indicating the quality of the radio connection between the base station and the respective user equipment and (b) reporting by the respective user equipment, the results of the performed radio measurements to the base station.

The described radio measurements can be of any type of measurement which among a plurality of other measurement types is known by persons skilled in the art. In particular, the described radio measurements can be measurements which are specified in various 3GPP technical specifications and/or which are mentioned in various 3GPP technical reports. For instance the so called Reference Signal Received Power (RSRP) or reference signal received quality (RSRQ) which are specified in 3GPP TS36.211 can be used as a preferred type of measurement which is carried out by the UEs. Since the RSRP measurements are specified for Long Term Evolution (LTE) telecommunication networks the embodiment of the described beam tilt angle optimization method described in this document can be carried out also for LTE telecommunication networks, which are expected to be widely used with a strong increase in the near future.

According to a further embodiment of the invention at least some of the user equipments (a) perform their radio measurements on a periodic basis and (b) report the results of the periodically performed radio measurements to the base station on a periodic basis. Thereby, the periodic basis for performing the radio measurements and the periodic basis for reporting the results of the periodically performed radio measurements may be preferably the same. However, it is explicitly mentioned that this is not indispensable. It may also be possible to e.g. reduce the frequency of reporting the measurements to the base station if e.g. the overall radio data traffic within the cell should be or has to be reduced.

According to a further embodiment of the invention obtaining a spatial user equipment distribution among a first sector of the cell and a second sector of the cell is based on information being indicative whether a certain user equipment is capable of reporting its radio measurement results (i) to a first part of the base station being associated with the first sector and/or (ii) to a second part of the base station being associated with the second sector.

Specifically, if e.g. the first sector is an inner sector of the cell and the second sector is an outer sector of the cell and a UE does not report to the inner sector (respectively to the first part of the base station being associated with the inner sector), it can be assumed that this UE is far away from the base station and that it cannot be served by the inner sector. Correspondingly, if a UE does not report to the outer sector (respectively to the second part of the base station being associated with the outer sector) it can be assumed that this UE is located close to the base station and cannot be served by the outer sector. Based on this measurement information an indication of UE locations within the whole cell can be estimated. UEs are either near to the base station, near to the outer cell border, or near to the border between the inner sector and the outer sector.

For instance, if there are many outer sector UEs reporting not only to the outer sector but also to the inner sector it would be beneficial to uptilt the antenna such that the inner sector also covers those UEs. Thereby, it is assumed that the radio data traffic load balance is correct and that the inner sector does not interfere too much with the outer sector. On the other hand, if there are not many outer sector UEs reporting to the inner sector (and the inner sector has a relatively high radio data traffic load) an uptilt of the antenna would not beneficial because such a measure could cause more interference to the outer sector. Further, in this case, if there would not be many inner sector UEs reporting to the outer sector, it would be beneficial to downtilt the beam in order to strengthen the inner sector.

According to a further embodiment of the invention obtaining a spatial user equipment distribution among a first sector of the cell and a second sector of the cell comprises for each one of the user equipments estimating a distance between the user equipment and a border between the first sector and the second sector based on a difference between a first signal level being assigned to the first sector and a second signal level being assigned to the second sector. This may provide the advantage that the actual position of the respective UE can be estimated in a very precise manner. This allows for obtaining or for determining the spatial user equipment distribution also in a more precise manner. As a consequence, the quality of the determined adjustment of the antenna tilt angle may be more accurate.

According to a further aspect of the invention there is provided an apparatus for determining an adjustment of a tilt angle for a beam emitted from an antenna of a base station which is serving a vertically sectorized cell of a cellular radio telecommunication network. The provided apparatus comprises (i) at least one processor and (ii) a memory storing a computer program code. The memory storing the computer program code is configured to, with the help of the at least one processor, to cause the apparatus to (a) configure user equipments being located in the vertically sectorized cell with dedicated measurements, (b) collect the dedicated measurements for a specific time interval, (c) obtain a spatial user equipment distribution among a first sector of the cell and a second sector of the cell based on the collected dedicated measurements, (d) ascertain an optimized spatial overlap region between the first sector and the second sector, and (e) determine the adjustment of the tilt angle based on the ascertained optimized spatial overlap region.

Also the described further aspect of the invention is based on the idea that an optimized tilt angle for a beam emitted from an antenna serving the cell can be determined in a reliable manner by determining an optimized spatial overlap region between the different sectors of a vertically sectorized cell based on a prior obtained spatial distribution of UEs among the different sectors of a cell.

According to a further aspect of the invention there is provided a base station for serving a vertically sectorized cell of a cellular radio telecommunication network. The provided base station comprises (a) an apparatus as described above, (b) a control system being connected to the apparatus, and (c) an antenna being connected to the control system and having at least two antenna elements which can be individually controlled by the control system in such a manner that phase shifts between the two antenna elements are selectable.

The provided base station is based on the idea that the apparatus described above can be implemented within a base station. This may contribute to the matter of fact that the above described method for determining an adjustment of a tilt angle for an antenna of the base station which is serving a vertically sectorized cell can be carried out in an effective manner. There is no need for transferring the information regarding the optimized adjustment of the tilt angle from another entity of the cellular radio telecommunication network.

However, in this respect it is mentioned that the described apparatus may also be contained in other network entities such as e.g. an operating subsystem (OSS).

According to a further aspect of the invention there is provided a computer-readable medium on which there is stored a computer program for determining an adjustment of a tilt angle for a beam emitted from an antenna of a base station which is serving a vertically sectorized cell of a cellular radio telecommunication network. The stored computer program, when being executed by a data processing device, is adapted for controlling and/or for carrying out the method according any one of the embodiments described above.

The computer-readable medium may be readable by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

According to a further aspect of the invention there is provided a program element for determining an adjustment of a tilt angle for a beam emitted from an antenna of a base station which is serving a vertically sectorized cell of a cellular radio telecommunication network. The provided program element, when being executed by a data processing device, is adapted for controlling and/or for carrying out the method according any one of the embodiments described above.

The program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program element may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
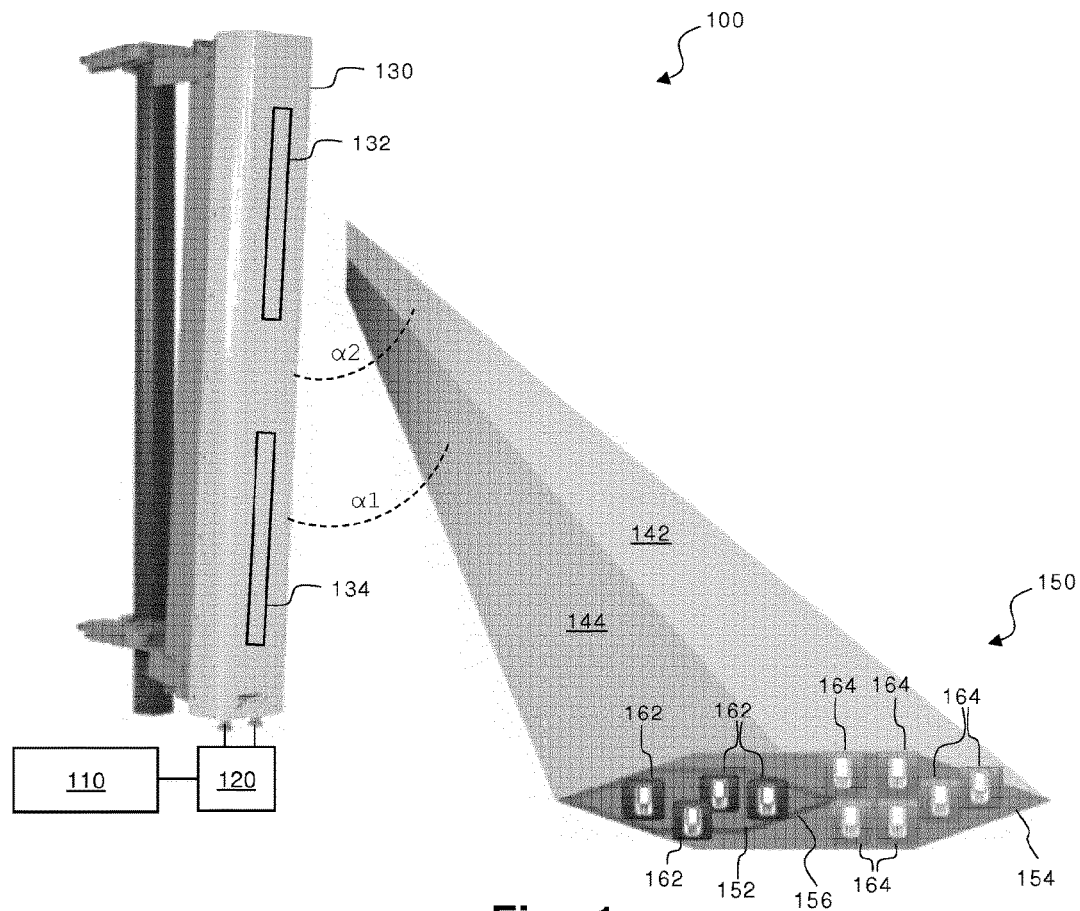
FIG. 1 shows in accordance with an embodiment of the invention a base station serving a vertically sectorized cell defining an inner sector and an outer sector.

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Embodiments of the present invention recognize that in a vertical sectorization system, beam tilt for the inner sector should be selected and optimized so that an inner sector will be able to provide a capacity increase for the system. The outer sectors tilt value depends primarily on propagation, but the ideal tilt value for the inner sector depends on the ever changing location of users in the cell, as well as traffic demand (downlink) and traffic offer (uplink). Such changing conditions pose special challenges to accurate planning of the inner sector beam tilt, particularly if tilt values need to be changed manually. In addition, if the inner sector and the outer sector operate on the same frequency, an excessively small difference in beam tilts between the inner sector and the outer sector can cause significant overlap and interference, decreasing capacity and degrading performance. For example, embodiments of the invention recognize that if a traffic hotspot—that is, an area in which traffic demands of user devices are particularly great—is present in a certain cell location, tilt values for the inner sector may be optimized so that the area where the traffic hotspot resides would be effectively covered without compromising performance for other user equipments or (user) communication end devices.

Embodiments of the invention therefore provide mechanisms for an automatic beam tilt optimization for active antenna/vertical sectorized systems. Such an approach (a) may improve service to a non-uniform resource demand that may be presented by UEs across the cell area and (b) may be used for adapting to constantly changing spatially varying radio data traffic conditions, seeking the beam tilt that best provides for an improved radio data capacity.

FIG. 1 shows in a schematic representation a base station 100 which is serving a vertically sectorized cell 150 of a cellular radio telecommunication network. The vertically sectorized cell 150 defines a first inner sector 152 and a second outer sector 154. Between the two sectors 152, 154 there is given a sector border 156. Around the sector border 156 there is given a non-depicted overlap region between the two sectors 152 and 154. In the scenario shown in FIG. 1, within the inner sector 152 there are located four "inner" UEs 162 and within the outer sector 154 there are located five "outer" UEs 164.

The base station 100 comprises an antenna array 100, a control system 120, and an apparatus 110 for controlling a tilt angle of a radio beam being emitted by the antenna array 100. In the schematic illustration given in FIG. 1 there are depicted two antenna elements arranged within the antenna array 100, a first antenna element 132 and a second antenna element 134. In reality the antenna array 130 may comprise a plurality of antenna elements. Thereby, the tilt angle determination and implementation is accomplished according to one or more embodiments of the present invention.

Specifically, based on input information from the apparatus 110 the control system 120 controls phase differences between the various antenna elements 132, 134. Depending on the selected phase differences a first tilt angle $\alpha 1$ for a first vertically controllable beam 142 and a second tilt angle $\alpha 2$ for a second vertically controllable beam 144 can be adjusted. As can be seen from FIG. 1, the first vertically controllable beam 142 serves the first inner sector 152 and the second vertically controllable beam 154 serves the second outer sector 154.

Figure 2:
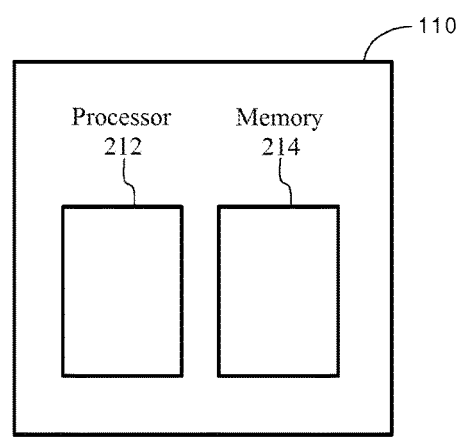
FIG. 2 shows the apparatus for controlling the tilt angle for a beam emitted by an antenna array of the base station shown in FIG. 1.

FIG. 2 shows the apparatus 110 for controlling the tilt angles $\alpha 1$, $\alpha 2$ of the antenna array 130 of the base station 110 shown in FIG. 1. The apparatus 110 comprises a processor 212 and a memory 214 being connected to the processor 212. The memory 214 stores a computer program code. Based on this computer program code the processor 212 is capable of controlling to operation of the apparatus such that a method for controlling the tilt angles $\alpha 1$, $\alpha 2$ of the beams 142, 144 emitted by the antenna array 130 is carried out. An exemplary embodiment of this method is described in the following with reference to FIG. 3.

Figure 3:
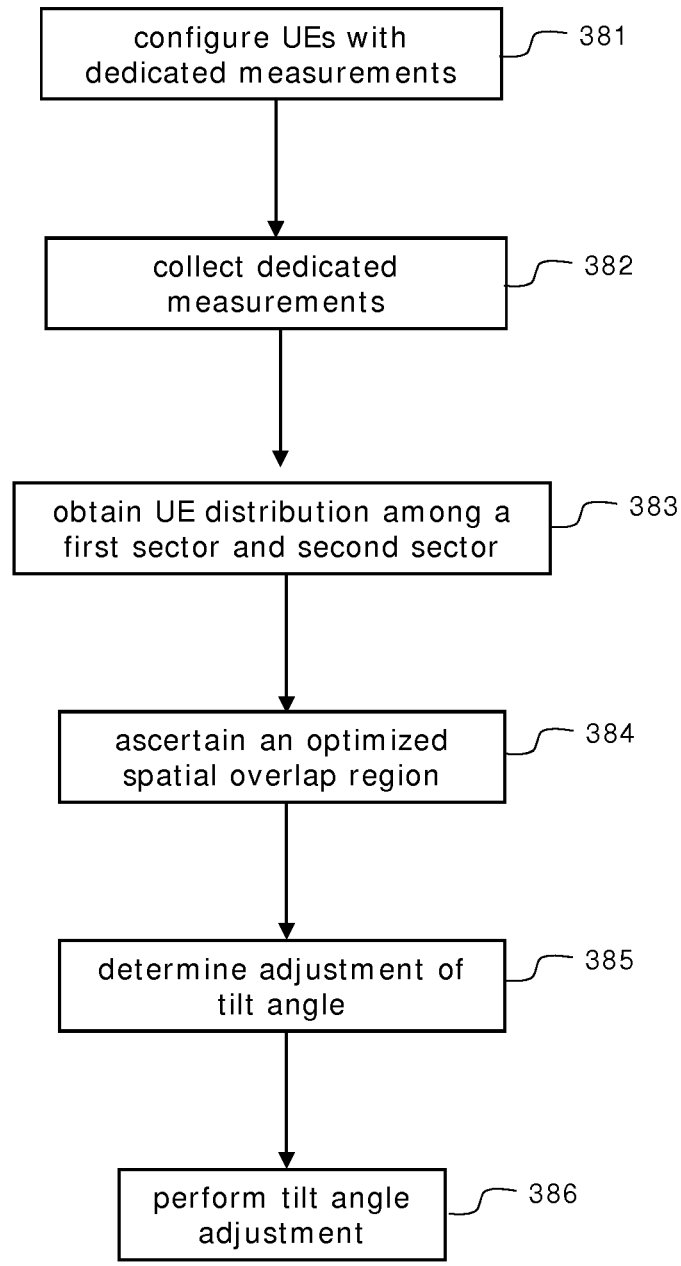
FIG. 3 shows a flow chart illustrating the method steps which are carried out when performing in accordance with an embodiment of the invention the method for determining an adjustment of a tilt angle for a beam being emitted by an antenna array of a base station serving a vertically sectorized cell.

FIG. 3 shows a flow chart illustrating the method steps which are carried out when performing in accordance with an embodiment of the invention a method for determining an adjustment of tilt angles $\alpha 1$, $\alpha 2$ of two beams emitted by an antenna array 130 of the base station 100 serving the vertically sectorized cell 150 of a cellular radio telecommunication network.

In a first step 381 UEs being located within the vertically sectorized cell are configured with dedicated measurements.

In a second step 382 these dedicated measurements are collected for respectively within a specific time interval. According to the exemplary embodiment described here the dedicated measurements are collected by a usual radio signaling from all UEs which are located within the first sector and within the second sector.

According to the exemplary embodiment described here the step of collecting the dedicated measurements comprises inter alia (a) performing, by the UEs, radio measurements indicating the quality of the radio connection between the base station and the respective UE, and (b) reporting, by the respective user equipment, the results of the performed radio measurements to the base station.

In a third step 383 there is obtained, based on the collected dedicated measurements, a spatial UE distribution among (i) a first sector of the vertically sectorized cell and (ii) a second sector of the vertically sectorized cell.

According to the exemplary embodiment described here the step of obtaining the spatial UE distribution comprises estimating, for each one of the UEs, a distance between the UE and a border between the first sector and the second sector based on a difference between a first signal level being assigned to the first sector and a second signal level being assigned to the second sector.

In a preferred LTE implementation, UEs of a vertically sectorized cell are ordered to perform periodical measurement reporting. Thereby, all UEs in the cell area report e.g. measured Reference Signal Received Power (RSRP) values for all sectors they can detect. For those UEs that report both to the second sector and to the first sector RSRP values it can be concluded that they are near to the border between the two sectors. By using periodical measurements, an extensive amount of measurements can be collected and a reliable estimate of UE location (in level of cell border, sector border, near site) can be created. In case of a 3G cellular radio telecommunication network similar steps can be taken based on monitored set reporting.

In another implementation, periodical reporting is triggered only for those UEs which are located within the handover zone, i.e. within the overlap region between the first sector and the second sector. By configuring e.g. LTE RRC Event A3 an offset being positive between the first sector reporting and the second sector reporting could be triggered before a potential handover between the two sectors would occur. A benefit of this option is that less handover signaling overhead would be required since only those UEs near to the sector border do such a reporting. As a minor drawback, however, no information about UEs in the middle of the sectors is generated. However, this could be easily overcome by comparing the total amount of UEs in the vertically sectorized cell and those performing a periodical reporting from the sector border. In addition to the above mentioned LTE RRC Event A3 also other thresholds, such as the LTE RRC Events A4 or B3 could be used.

In a fourth step 384 there is ascertained an optimized spatial overlap region between the first sector and the second sector based on the obtained spatial user equipment distribution.

In a fifth step 385 there is determined the adjustment of the tilt angle based on the ascertained optimized spatial overlap region.

In a sixth step 386 there is performed the tilt angle adjustment which has been determined with the previous step 385.

According to the exemplary embodiment described here all method steps are performed by the apparatus which is shown in FIGS. 1 and 2 and which is described above. For carrying out the last method step 385 the apparatus corporates with the control system 120 shown in FIG. 1.

When using the inventive method described in this document a vertical sectorization (VS) inner sector tilt optimization will be more accurate, because the corresponding algorithm have prior knowledge on impact of beam tilt angle changes. Therefore, the risk for wrong decisions regarding a beam tilt adjustment are less. This may lead to a faster and more accurate beam tilt angle optimization as compared to prior art beam tilt angle adjustment procedures.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS 100 base station
110 apparatus
120 control system
130 antenna array
132 first antenna element
134 second antenna element
142 first vertically controllable beam
144 second vertically controllable beam
150 vertically sectorized cell
152 first/inner sector
154 second/outer sector
156 sector border
162 UEs in inner sector/"inner UEs"
164 UEs in outer sector/"outer UEs"
$\alpha 1$ tilt angle of first vertically controllable beam
$\alpha 2$ tilt angle of second vertically controllable beam
212 processor
214 memory
381 first step
382 second step
383 third step
384 fourth step
385 fifth step
386 sixth step

The invention claimed is:

1. A method for determining an adjustment of a tilt angle ($\alpha 1$, $\alpha 2$) for a beam emitted from an antenna of a base station which is serving a vertically sectorized cell of a cellular radio telecommunication network, the method comprising:

configuring user equipments being located in the vertically sectorized cell with dedicated measurements, collecting the dedicated measurements for a specific time interval, obtaining a spatial user equipment distribution among a first sector of the cell and a second sector of the cell based on the collected dedicated measurements, ascertaining an optimized spatial overlap region between the first sector and the second sector based on the obtained spatial user equipment distribution, and determining the adjustment of the tilt angle ($\alpha 1$, $\alpha 2$) based on the ascertained optimized spatial overlap region.

2. The method as set forth in claim 1, wherein the first sector is an inner sector of the cell and the second sector is an outer sector of the cell.

3. The method as set forth in claim 1, wherein the vertically sectorized cell comprises at least one further sector, the spatial user equipment distribution is obtained among the first sector, the second sector and the at least one further sector, the method further comprises ascertaining at least one further optimized spatial overlap region between (i) the at least one further sector and (ii) the first sector and the second sector, and the adjustment of the tilt angle is further based on ascertained at least one further optimized spatial overlap region.

4. The method as set forth in claim 1, wherein dedicated measurements of selected user equipments exclusively configured with the dedicated measurements are collected, which selected user equipments are located in a predefined spatial overlap region between the first sector and the second sector.

5. The method as set forth in claim 1, wherein collecting the dedicated measurements further comprises:

performing, by the user equipments, radio measurements indicating the quality of the radio connection between the base station and the respective user equipment, and reporting, by respective user equipment, results of the performed radio measurements to the base station.

6. The method as set forth in claim 5, wherein at least some of the user equipments perform their radio measurements on a periodic basis and report results of the periodically performed radio measurements to the base station on a periodic basis.

7. The method as set forth in claim 5, wherein obtaining a spatial user equipment distribution among a first sector of the cell and a second sector of the cell is based on information being indicative whether a certain user equipment is capable of reporting its radio measurement results (i) to a first part of the base station being associated with the first sector or (ii) to a second part of the base station being associated with the second sector.

8. The method as set forth in claim 5, wherein obtaining a spatial user equipment distribution among a first sector of the cell and a second sector of the cell comprises for each one of the user equipments estimating a distance between the user equipment and a border between the first sector and the second sector based on a difference between a first signal level being assigned to the first sector and a second signal level being assigned to the second sector.

9. An apparatus for determining an adjustment of a tilt angle ($\alpha 1$, $\alpha 2$) for a beam emitted from an antenna of a base station which is serving a vertically sectorized cell of a cellular radio telecommunication network, the apparatus comprising:

at least one processor, and a memory storing a computer program code, wherein the memory storing the computer program code is configured to, with the at least one processor, to cause the apparatus to configure user equipments being located in the vertically sectorized cell with dedicated measurements, collect the dedicated measurements for a specific time interval, obtain a spatial user equipment distribution among a first sector of the cell and a second sector of the cell based on the collected dedicated measurements, ascertain an optimized spatial overlap region between the first sector and the second sector, and determine the adjustment of the tilt angle ($\alpha 1$, $\alpha 2$) based on the ascertained optimized spatial overlap region.

10. A base station for serving a vertically sectorized cell of a cellular radio telecommunication network, the base station comprising:

an apparatus as set forth in claim 9, a control system being connected to the apparatus, and an antenna being connected to the control system and having at least two antenna elements which can be individually controlled by the control system in such a manner that phase shifts between the two antenna elements are selectable.

11. A non-transitory computer-readable medium on which there is stored a computer program for determining an adjustment of a tilt angle ($\alpha$, $\alpha 2$) for a beam emitted from an antenna of a base station which is serving a vertically sectorized cell of a cellular radio telecommunication network, the computer program, when being executed by a data processing device, is configured to configure user equipments being located in the vertically sectorized cell with dedicated measurements, collect the dedicated measurements for a specific time interval, obtain a spatial user equipment distribution among a first sector of the cell and a second sector of the cell based on the collected dedicated measurements, ascertain an optimized spatial overlap region between the first sector and the second sector, and determine the adjustment of the tilt angle ($\alpha 1$, $\alpha 2$) based on the ascertained optimized spatial overlap region.

12. A program element embodied on a non-transitory computer-readable medium for determining an adjustment of a tilt angle ($\alpha 1$, $\alpha 2$) for a beam emitted from an antenna of a base station which is serving a vertically sectorized cell of a cellular radio telecommunication network, the program element, when being executed by a data processing device, is configured to control or to carry out the method as set forth in claim 1.

* * * * *